(12) United States Patent
Roberts et al.

(10) Patent No.: US 6,632,306 B1
(45) Date of Patent: Oct. 14, 2003

(54) METHOD AND APPARATUS FOR SPLICING DRIP IRRIGATION TAPE

(75) Inventors: John C. Roberts, Carlsbad, CA (US); Jack Butler, Carlsbad, CA (US)

(73) Assignee: Roberts Group Holdings, LLC, San Marcos, CA (US)

( * ) Notice: Subject to any disclaimer, the term of this patent is extended or adjusted under 35 U.S.C. 154(b) by 0 days.

(21) Appl. No.: 09/632,813

(22) Filed: Aug. 7, 2000

(51) Int. Cl.7 .......................... B29C 73/14; B65H 69/06
(52) U.S. Cl. ......................... 156/95; 156/94; 156/158; 156/294; 156/293; 156/296; 156/304.3; 156/304.6
(58) Field of Search ............................ 156/95, 94, 158, 156/159, 293, 294, 303.1, 304.1, 304.2, 304.3, 304.6, 321, 322, 583.1, 583.4

(56) References Cited

U.S. PATENT DOCUMENTS

| | | | |
|---|---|---|---|
| 3,666,586 A | 5/1972 | Lacey | |
| 3,939,875 A | * 2/1976 | Osborn et al. | 138/178 |
| 4,092,193 A | * 5/1978 | Brooks | 156/83 |
| 4,204,897 A | * 5/1980 | Bartell et al. | 156/155 |
| 4,257,630 A | 3/1981 | Bartell et al. | |
| 5,690,769 A | 11/1997 | Daigle et al. | |
| 5,879,503 A | 3/1999 | McDunn et al. | |
| 5,954,372 A | 9/1999 | Moynihan | |
| 6,090,233 A | 7/2000 | Delmer | |
| 6,276,114 B1 | * 8/2001 | Hayashi | 53/374.2 |

FOREIGN PATENT DOCUMENTS

EP 0116019 A1 * 8/1984 ........... B29C/27/04

* cited by examiner

*Primary Examiner*—Richard Crispino
*Assistant Examiner*—George R. Koch, III

(57) ABSTRACT

A method of splicing together the ends of two lengths of drip irrigation tape is disclosed in which a tubular insert having an inner layer of high melting point material and an outer layer of bonding material is placed into the end of a first length of drip irrigation tape so that a portion of the insert projects outwardly from the end of the tape. The end of a second length of drip irrigation tape is then placed over the projecting end of the tubular insert so that the two tape ends are butted up against one another or close to one another. Both lengths of tape are then sealed to the outer bonding layer of the insert.

11 Claims, 3 Drawing Sheets

METHOD AND APPARATUS FOR SPLICING DRIP IRRIGATION TAPE

BACKGROUND OF THE INVENTION

The present invention relates to a method and apparatus for splicing two pieces of drip irrigation tape together.

Drip tape, which is commonly made of polyethylene, often needs to be spliced for various reasons. First, if it is damaged after installation in the field, the damaged portion is cut out and replaced by a new length of tape which must be spliced at both ends to the cut ends of the existing tape. Second, when tape is installed along a field row, it is typically unwound from a roll of such tape. When the end of a roll is reached, the beginning of a new roll must be spliced to the end of the old roll. Finally, when drip tape is retrieved from the field for reuse at another time, it is typically spooled onto long rolls which are several thousand feet in length. Since the length of a typical field row is shorter than this, pieces must be spliced together so that the retrieved roll will be one continuous length of drip tape.

Several drip tape splicing methods are known, such as the splicing method described in U.S. Pat. No. 5,690,769 of Daigle et al. In this method, a flat insert is inserted into the end of one hose to be spliced, and the other hose end is overlapped over the first hose so that the insert also extends into the second hose end. The flat splicing insert has a bonding surface of a low melting point, bonding material, and an opposite, non-bonding surface of high melting point polyester. The overlapped hose ends are then pressed and heated between opposing heating elements, so that the hose ends fuse to each other, and to the bonding surface of the splicing insert. One problem with such flat splicing inserts is that unbonded portions may be caused to collapse into the drip tape conduit by the pressure of water flowing through the tape, potentially causing a blockage.

In U.S. Pat. No. 5,879,503 of McDunn et al, an insert of high temperature plastic is placed inside the tube ends with the tube ends adjacent one another. A bonding material is then centered over the adjacent tube ends, and heated clamp jaws are closed over the resultant assembly. This melts the bonding material to attach the tubes together, while the high temperature insert prevents the tubes from sealing together to seal the conduit closed. However, the insert remains loose in the conduit after sealing is complete, and will be pushed downstream by water forces when the tape is in use.

SUMMARY OF THE INVENTION

It is an object of the present invention to provide a new and improved drip irrigation tape splicing apparatus and method.

According to one aspect of the present invention, a method of splicing together the ends of two lengths of drip irrigation tape is provided, which comprises the steps of placing a tubular insert having an inner layer of high melting point material and an outer layer of bonding material into the end of a first length of drip irrigation tape so that a portion of the insert projects outwardly from the end of the tape, placing the end of a second length of drip irrigation tape over the projecting end of the tubular insert so that the second tape end is positioned adjacent the end of the first length of tape, and sealing both lengths of tape to the outer bonding layer of the insert.

The tubular insert may be an integral two layer insert with the layers bonded together. Alternatively, it may comprise two separately formed cylindrical insert layers, with a smaller diameter, higher melting point inner insert layer being inserted into a larger diameter, lower melting point outer insert layer, prior to insertion of the insert assembly into one of the tape ends. The separate layers may be color coded for ease of assembly, and notches may be provided for engagement when the two insert layers are in proper register.

In one embodiment of the invention, the outer layer of the tubular insert is a low melting point plastic material such as polyethylene, and each length of tape is gripped over and pressed over the insert between a pair of opposed, heated clamping jaws so that the tape is melted and fused to the outer surface of the insert. Application of pressure collapses opposing portions of the tape and enclosed insert inwards, pressing the inside of the tape against the outer bonding layer and pressing opposing portions of the inner, high melting point material against each other, so that the conduit cannot fuse closed. Alternatively, the bonding material may be an adhesive coating the outside of the tubular insert, and the two lengths of tape may be simply gripped over the insert by clamping jaws such that the adhesive bonds each length of tape to the insert. In another alternative, instead of two pairs of clamping jaws, a single heated clamping jaw is used to create a single seal at the point where the two lengths of drip tape butt up against each other, simultaneously sealing both ends to the outer layer of the insert. After creating the seals, the jaw or jaws are cooled to allow the seals to cure.

According to another aspect of the present invention, a splice apparatus for splicing the ends of two pieces of drip irrigation tape is provided, which comprises a tubular insert for insertion into the ends of the two pieces of tape with the ends placed adjacent one another over the insert, the insert having an inner cylindrical layer of high melting point material and an outer layer of bonding material, and a clamp assembly for gripping the tape pieces over the insert to bond each tape to the outer bonding layer of the insert.

In one exemplary embodiment, the outer layer is of a low melting point plastic material for forming a seal with the tape material, and the clamp assembly has opposing heated jaws for melting the outer layer of the insert and bonding the tape pieces to the insert. The clamp may comprise two spaced pairs of opposing heated jaws, one pair for gripping and sealing a first piece of drip tape over the insert adjacent the end of the drip tape, and the other pair for gripping and sealing the second piece of drip tape over the insert adjacent the end of the second piece, forming two spaced circumferential seals.

In this method and apparatus, since the insert is tubular and has a high temperature melting point inner layer, the conduit cannot be blocked by the insert. The tape ends will be sealed to the outer layer of the insert, while the inner layer of high melting point material will remain unmelted and will not fuse to itself. Additionally, because the drip tape pieces are sealed to the insert and not to each other, the method is less dependent on the properties of the drip tape being sealed, so that it can be more universally applied. The low melting point outer layer of the insert can be selected to be made of a material which melts easily and forms a good seal with most drip tapes. The lower melting point material results in less energy required to form the seal.

The tubular insert can be made rigid enough that it is not caused to collapse into the drip tape conduit by water flowing through the tape. This is not the case with flat inserts employed in prior art methods. Since the insert positively adheres to the drip tape it is sealed to, it cannot be pushed downstream by water forces within the tape, as with some prior art flat inserts.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which.

DETAILED DESCRIPTION OF THE DRAWINGS

Figure 1:
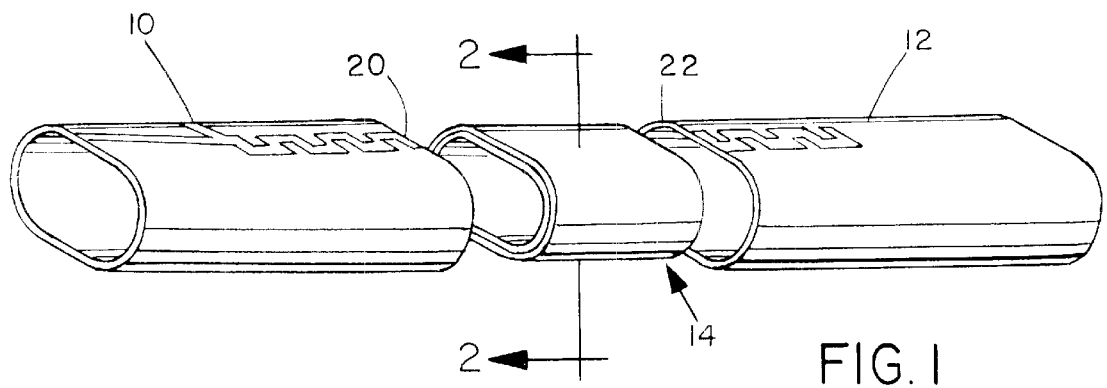
FIG. 1 is a side elevation view illustrating a splicing insert according to an exemplary embodiment of the invention prior to insertion into the ends of two pieces of drip tape to be spliced.
Figure 2:
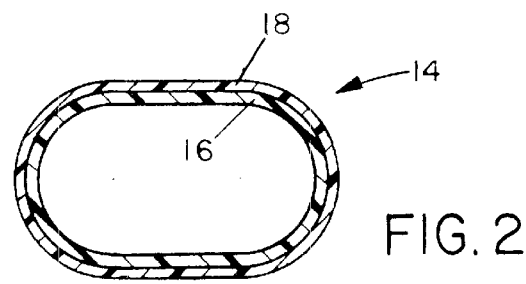
FIG. 2 is an enlarged cross-sectional view of the insert taken along lines 2—2 of FIG. 1.

FIGS. 1 to 8 illustrate a method and apparatus for splicing together the ends of two pieces 10,12 of drip irrigation tape, particularly polyethylene drip irrigation tape. The splicing apparatus basically comprises a two layer, tubular insert 14 for inserting into both tape ends, and a splicing tool 15 having heated jaws for sealing each piece of drip tape to the insert, as described in more detail below.

In the illustrated embodiment, the hollow tubular insert 14 has an inner layer 16 of a high melting point plastic material, such as Kapton® or Mylar®, both manufactured by E. I. Du Pont and De Nemours & Co., and an outer layer 18 of a low melting point plastic material such as polyethylene. Alternatively, the outer layer 18 may be of an adhesive bonding material. The type of material and the thickness of the layers is selected such that the tubular insert is relatively rigid and self-supporting, and will not tend to collapse inwardly on itself unless compressed from outside.

Figure 3:
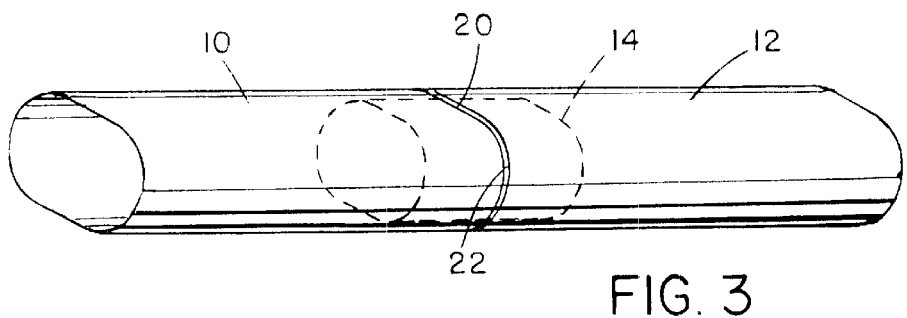
FIG. 3 is a side elevation view illustrating a subsequent step in a splicing method according to an exemplary embodiment of the invention, showing the ends of the two pieces of drip tape extending over the insert and positioned adjacent one another.
Figure 4:
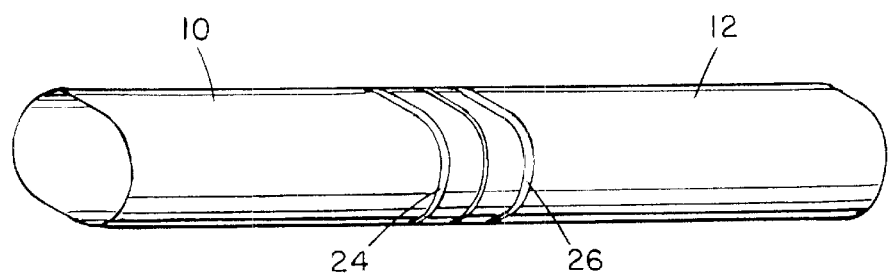
FIG. 4 is a side elevation view similar to FIG. 3 showing the two pieces of drip tape sealed to the insert along spaced circumferential seals.
Figure 7:
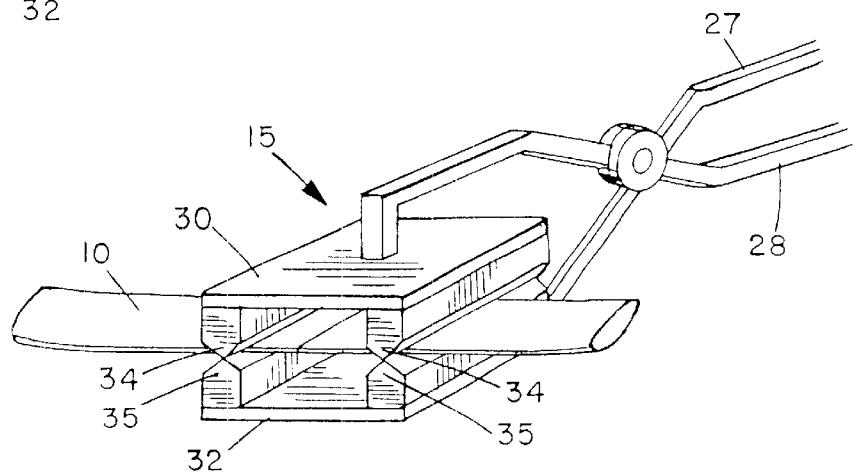
FIG. 7 is a schematic view illustrating the tool of FIGS. 5 and 6 sealing two pieces of drip tape to an insert.
Figure 8:
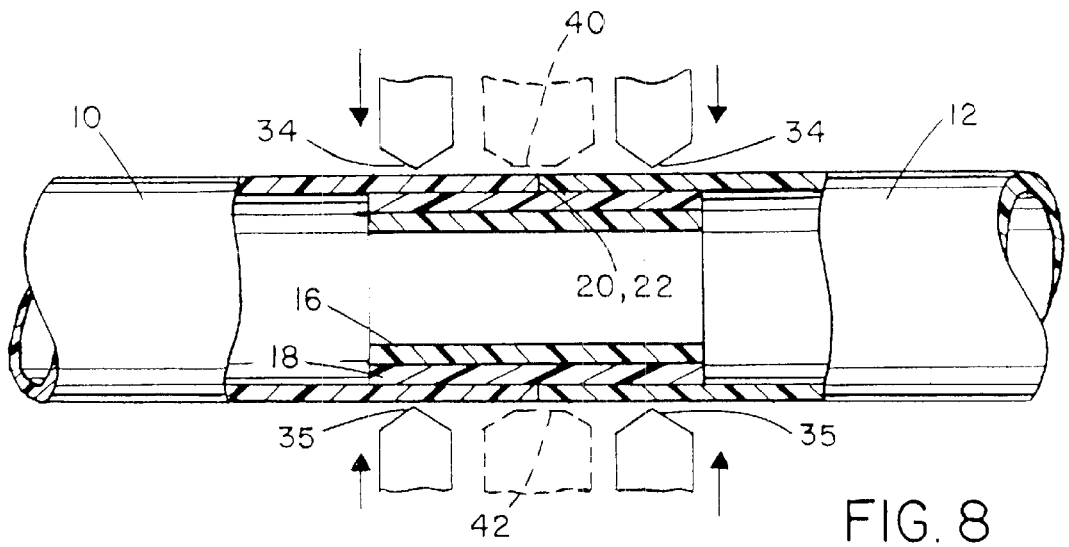
FIG. 8 is an enlarged horizontal cross-section through the tape ends when extending over the insert as in FIG. 3, illustrating in solid outline, a spaced pair of heated clamp jaws prior to gripping and sealing the tape ends, with an alternative single pair of clamp jaws, shown in dotted outline, for use in a modified method according to another embodiment of the invention.

In one exemplary embodiment of the invention, as illustrated in FIGS. 3,4, 7 and 8, one end of the splicing insert 14 is inserted into the end 20 of one of the pieces 10 of drip irrigation tape, such that at least part of the insert, and preferably about half of the insert, projects outwardly from end 20. The end 22 of the other piece 12 of tape is then engaged over the projecting part of insert 14, with the tape ends 20,22 preferably butted up close together as indicated in FIGS. 3 and 8. A gap is shown between the tape ends in FIG. 3 for illustrative purposes, but the tape ends are butted up against one another in the exemplary embodiment of the invention, as illustrated in FIG. 8. The two tape pieces are then each heat sealed to the outer layer of the insert along circumferentially extending seals or seal bands 24,26, as illustrated in FIG. 4.

Figure 5:
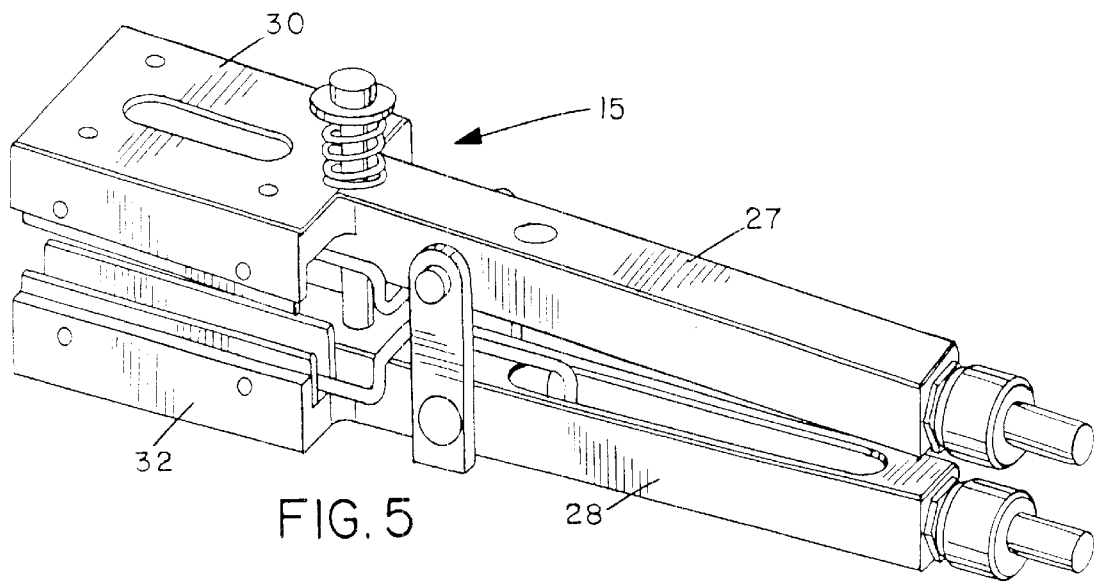
FIG. 5 is a perspective view of a splicing tool for use in the exemplary splicing method of the invention.
Figure 6:
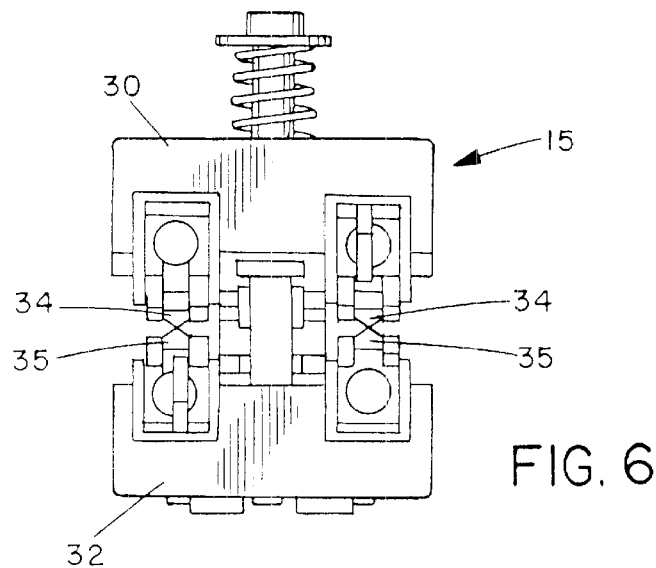
FIG. 6 is an end elevational view illustrating the spaced pairs of heated clamping jaws of the tool of FIG. 5.

FIGS. 5 to 7 illustrate a splicing tool 15 according to an exemplary embodiment of the present invention for forming the seals 24,26 of FIG. 4. The tool 15 basically comprises a pair of hinged arms 27,28 each having a clamp head 30,32, respectively, at its outer end. The clamp head 30 has a pair of spaced clamping jaws 34 which are positioned opposite corresponding spaced clamping jaws 36 on the other clamp head 32. The opposing clamping jaws are heated via electrical inputs 38, and can be releasably locked together in the closed position of FIGS. 6 and 7. The opposing pairs of clamping jaws 34,35 are illustrated in FIG. 8 in position over the overlapped tape ends and insert, prior to being clamped down over the tape ends as in FIG. 7.

After the two tape ends have been appropriately positioned over the insert or splice tube 14, with the insert 14 centered under the joint and the tape ends butted up against or close to one another, the splicing tool is appropriately positioned with the clamp heads opposing one another over the joint, with the handle ends of the arms squeezed towards one another in order to hold the tool in the open position, as generally indicated in solid outline in FIG. 8. Once the clamp heads and jaws 34,35 are properly positioned, the opposing clamp heads are squeezed shut, into the closed position illustrated in FIG. 6 and 7, and are releasably locked together in the closed position. This squeezes or presses the portions of tape between the jaws down over the insert, as indicated, and collapses both the hoses and the underlying insert, so that opposing portions of the inner layer of the insert are pressed against one another, between jaws 34 and 35. At the same time, the power supply to the jaws 34,35 is turned on in order to heat the jaws, simultaneously heating the clamped portions of tape and the underlying outer layer of the insert. This melts the irrigation tape and the outer layer of the insert in the regions gripped between the jaws, bonding the two tape pieces to the outer layer of the insert in regions 24 and 26, creating two water tight seals. At the same time, the inner layer 16 of high temperature plastic will remain unmelted, so that the insert does not bond to itself or cause any blockage. The power supply to the jaws is then turned off, cooling the jaws and allowing the seals to cure.

Figure 9:
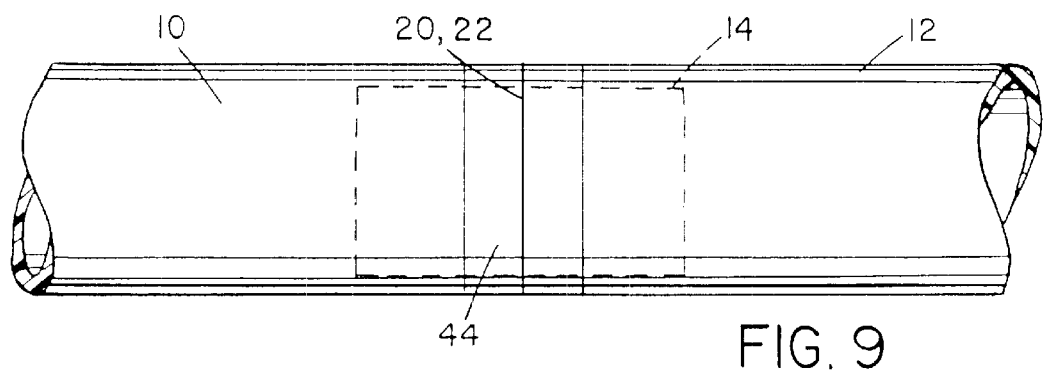
FIG. 9 is a side elevation view illustrating two pieces of drip tape sealed to the insert along a single circumferential seal band.

FIGS. 8 and 9 illustrate a modified sealing method according to the invention in dotted outline. In this method, rather than forming two spaced seals on opposite sides of the joint, a single seal is formed over the abutting ends of the two pieces 10,12 of tape. The method in this case is identical to the previous embodiment as illustrated in FIGS. 1 and 3 up to the point where the two ends of tape pieces 10,12 are positioned over the insert 14 and butted up against one another. At this point, a different splicing tool having only one pair of opposing jaws 40,42, illustrated in dotted outline in FIG. 8, is used to form a single seal band 44 at the point where the two pieces of tape butt against one another. The two jaws 40,42 are positioned on opposite sides of the abutted tape ends, as indicated in FIG. 8, and are then closed to apply heat and pressure to the joint. Both tape ends will then be melted, as will the underlying portion of the outer layer of the insert, melting each tape end to the insert and forming a sealed joint 44. The opposing jaws 40,42 are then cooled, allowing the seal to cure.

In an alternative embodiment, the insert 14 may have an outer layer of adhesive rather than low melting point plastic, and the overlying tape ends may be gripped between opposing jaws in order to bond to the adhesive. Heat may or may not be necessary in this case.

Figure 10:
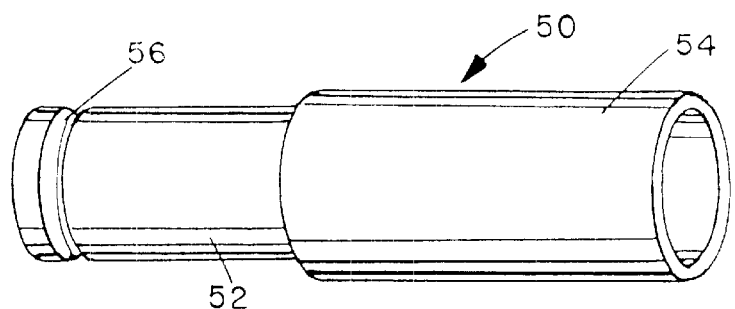
FIG. 10 is a side elevation view illustrating an insert assembly according to another embodiment of the invention.
Figure 11:
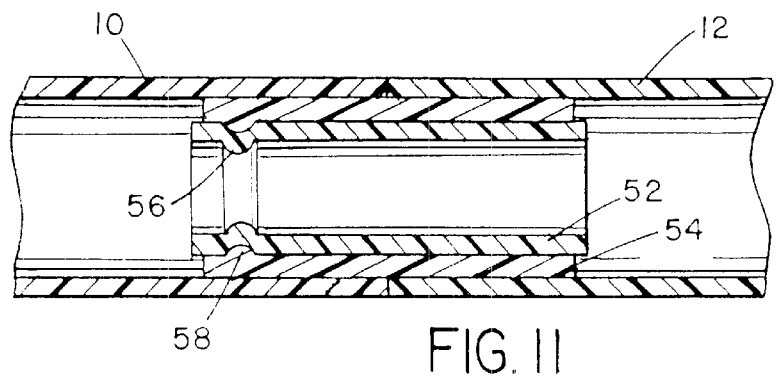
FIG. 11 is a horizontal cross-sectional view illustrating the insert assembly of FIG. 10 fully assembled with tape ends extending over the insert assembly prior to the gripping and sealing of the tape ends to the outer insert layer.

FIGS. 10 and 11 illustrate a modified sealing method and apparatus according to another embodiment of the invention. In the previous embodiments, the insert was integrally formed as a one-piece, two layer insert with the two layers bonded or fused together. In this embodiment, an insert assembly 50 comprises two separate, nested inserts 52,54. The tubular inner insert 52 is of slightly smaller diameter than the tubular outer insert 54. The difference in diameter is such that the outer insert can slide onto the inner insert 52, in the direction of the arrow in FIG. 10. The outer insert 54 is of length equal to or slightly less than the inner insert 52, such that it does not protrude beyond the ends of the inner insert when the two inserts are properly assembled in the position illustrated in FIG. 11. The inner insert may be of the same high melting point material as the inner layer 16 of insert 14 of the previous embodiment, while the outer insert is of the same low melting point material as the outer layer 18 of insert 14.

The inner insert 52 has a notch or groove 56 adjacent one end, while the outer insert 54 has an annular rib or protrusion 58 adjacent the corresponding end. The rib 58 will snap into groove 56 when the outer insert 54 is in proper registration over the inner insert 52, ensuring that the outer insert is not pushed too far over the inner insert. The inserts may be coded or colored to ensure proper assembly.

The insert assembly 50 will be used in a similar manner to insert 14 once the outer insert 54 is assembled in proper registration over inner insert 52. As in the previous embodiment, the insert assembly will be inserted into the end of one tape 10 to be spliced, such that part of the assembly 50 protrudes from the end of the tape. The end of a second tape 12 is then placed over the protruding end of the insert assembly 50 and positioned adjacent or in abutment with the other tape end, as indicated in FIG. 11. The tape ends may then be spliced to the outer, low melting point insert 54 using the splicing tool of FIGS. 5 to 8, or the alternative splicing tool indicated in dotted outline in FIG. 8.

This invention has advantages over prior art splicing methods in which flat inserts were used to prevent the tape from bonding to itself during splicing, blocking the conduit. In this invention, the drip tape pieces are sealed to an insert rather than to each other. This makes the method less dependent on the properties of the material of the drip tape that is being sealed, making it more universally applicable. The low melting point outer layer of the insert can be such that it easily melts and forms a good seal with most drip tapes. This also results in less energy being needed to form the seal. At the same time, the insert can be made rigid enough that it does not collapse easily into the drip tape as a result of water flowing through the tape. This can be a problem with the prior art flat inserts. Since the tubular insert is positively adhered to the drip tape around its entire circumference, it cannot be pushed downstream or deformed to form a blockage by water forces within the tape.

Although some exemplary embodiments of the invention have been described above by way of example only, it will be understood by those skilled in the field that modifications may be made to the disclosed embodiments without departing from the scope of the invention, which is defined by the appended claims.

We claim:

1. A method of splicing together the ends of two lengths of drip irrigation tape, comprising the steps of:

placing a tubular insert having an inner layer of high melting point material and an outer layer of bonding material into the end of a first length of drip irrigation tape so that a portion of the insert projects outwardly from the end of the tape, the two layers of the insert each being of flexible material;

placing the end of a second length of drip irrigation tape over the projecting end of the tubular insert so that it is positioned in an adjacent but non-overlapping relationship with the end of the first length of tape; and sealing both lengths of tape to the outer bonding layer of the insert.

2. The method as claimed in claim 1, wherein both lengths of tape are sealed to the insert around a single seal region extending across the adjacent ends of the two lengths of tape.

3. The method as claimed in claim 1, wherein the outer layer of the tubular insert is a low melting point plastic material and the inner layer is a high melting point plastic material, and each length of tape is sealed to the outer layer of the insert by heating the tape and underlying outer layer of the insert to melt both the tape and outer layer, and cooling the tape to allow the resultant seal to cure.

4. The method as claimed in claim 1, wherein the bonding material is an adhesive coating the outside of the tubular insert, and the two lengths of tape are gripped over the insert by clamping jaws such that the adhesive bonds each length of tape to the insert.

5. The method as claimed in claim 1, wherein the outer layer of the insert tube is polyethylene.

6. The method as claimed in claim 1, wherein the tubular insert is formed as two separate layers, and further comprising the step of, prior to placing the tubular insert into the end of a first length of irrigation tape, sliding the outer layer over the inner layer until the two layers are nested together and the ends of the outer layer do not protrude beyond the ends of the inner layer.

7. The method as claimed in claim 1, wherein the two layers of the insert are bonded together prior to placing into the end of the first length of drip irrigation tape.

8. A method of splicing together the ends of two lengths of drip irrigation tape, comprising the steps of:

placing a tubular insert having an inner layer of high melting point material and an outer layer of bonding material into the end of a first length of drip irrigation tape so that a portion of the insert projects outwardly from the end of the tape;

placing the end of a second length of drip irrigation tape over the projecting end of the tubular insert so that it is positioned adjacent the end of the first length of tape;

sealing both lengths of tape to the outer bonding layer of the insert by applying heat and pressure to opposing portion of the tape length so as to collapse said opposing portions and the underlying portions of the tubular insert inwardly towards one another, and heat the opposing portions of the tape lengths and the outer layer of the collapsed portion of the tubular member so as to melt the outer layer and fuse it to both tubular members without melting the inner layer;

operating the jaws to allow the tape length and bonded insert member to return to a tubular configuration; and the first length of tape being sealed to the insert only along a first circumferential seal spaced from the end of the first length of tape, and the second length of tape being sealed to the insert only along a second circumferential seal spaced from the first seal.

9. A method of splicing together the ends of two lengths of drip irrigation tape, comprising the steps of:

placing a two layer tubular insert having an inner layer of collapsible, high melting point material and an outer layer of bonding material into the end of a first length of drip irrigation tape so that a portion of the insert projects outwardly from the end of the tape;

placing the end of a second length of drip irrigation tape over the projecting end of the tubular insert so that it is positioned in an adjacent but non-overlapping relationship with the end of the first length of tape;

gripping the two lengths of tape and the enclosed insert between at least one pair of opposing heated clamping jaws;

urging the clamping jaws towards one another so as to squeeze the tape lengths and underlying insert inwardly and urge opposing portions of the inner layer of the insert towards one another;

heating the jaws so as to heat underlying portions of the tape lengths and insert so as to melt the tape portions and underlying portions of the outer layer of the insert so as to seal both lengths of tape to the underlying outer bonding layer without melting the inner layer so that it does not bond to itself; and releasing the clamping jaws to allow the tape lengths and two layer insert to return to a tubular shape.

10. The method as claimed in claim 9, wherein the two lengths of tape and the underlying insert are gripped between one pair of opposed, heated clamping jaws to form the seal.

11. The method as claimed in claim 9, wherein the first length of tape and underlying portion of the insert are gripped between a first pair of opposed, heated clamping jaws to form a first seal with the outer layer of the insert and the second length of tape and underlying portion of the insert are gripped between a second pair of opposed, heated clamping jaws to form a second seal with the outer layer of the insert.

\* \* \* \* \*